March 8, 1960     H. L. BOCHMAN, JR     2,927,491
POWER OPERATED, MAGAZINE FED, FASTENER DRIVING TOOL
Filed Oct. 20, 1958
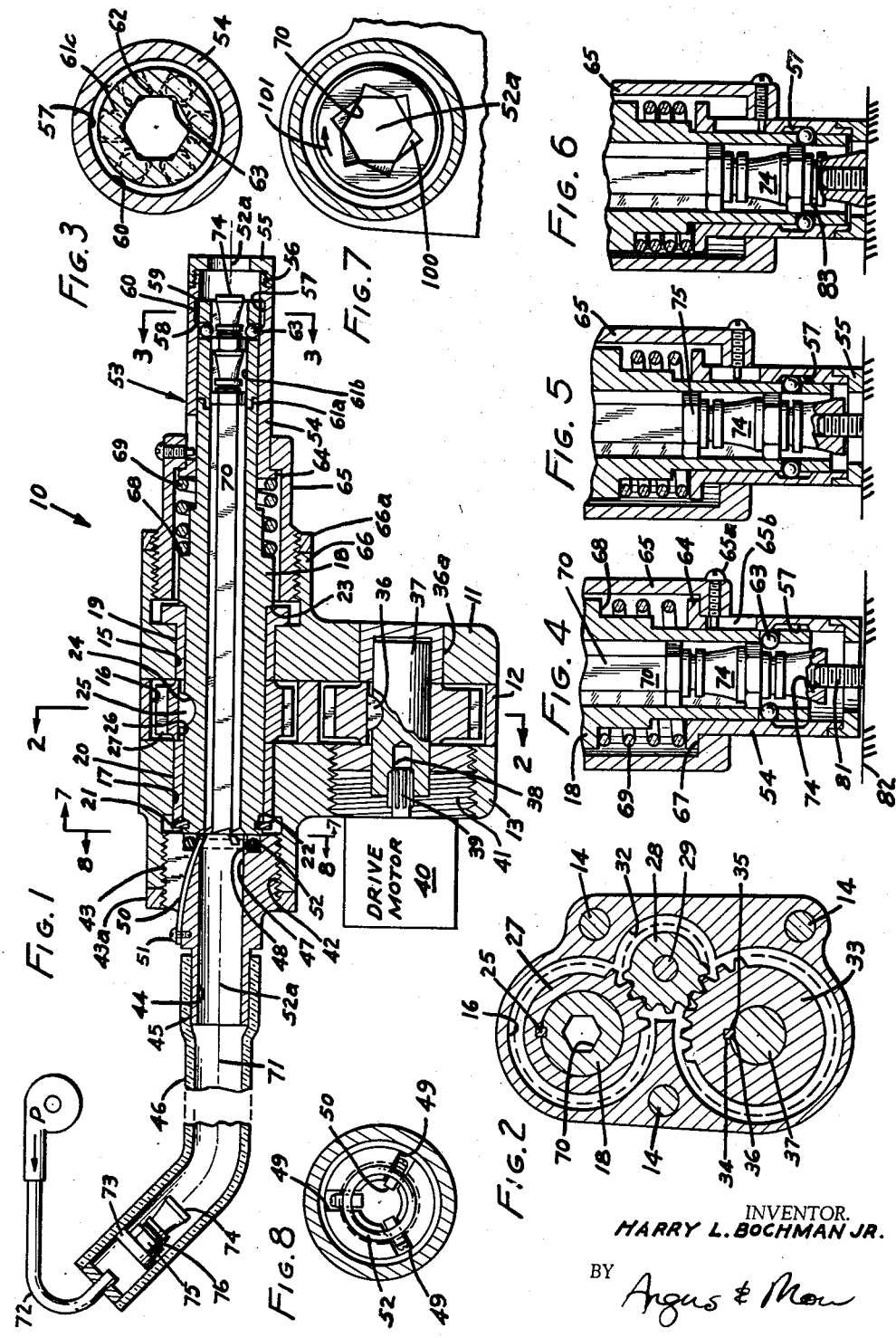
INVENTOR.
*HARRY L. BOCHMAN JR.*
BY *Angus & Mow*
ATTORNEYS.

United States Patent Office 2,927,491
Patented Mar. 8, 1960

2,927,491

POWER OPERATED, MAGAZINE FED, FASTENER DRIVING TOOL

Harry L. Bochman, Jr., Los Angeles, Calif., assignor to Hi-Shear Rivet Tool Corporation, Torrance, Calif., a corporation of California Application October 20, 1958, Serial No. 768,307

15 Claims. (Cl. 81—54)

This invention relates to a power operated driver for driving nuts and like objects.

An object of this invention is to provide a power-actuated driver which is adapted to tighten down nuts and similar objects onto studs or other threaded objects. A related object is to provide automatic feed means for providing nuts for driving in rapid succession without requiring the operator to handle the nuts.

This invention comprises a driver with a body that mounts a rotatable hollow-centered spindle. The spindle has a non-circular profile so it can make a driving engagement with the nut to be driven. A feed tube is connected to the spindle and between them there is a drag means which at least partially brake the rotation of the nut until the nut is fully engaged by the spindle. The nut is biased toward the spindle so as to be forced therein.

A feature of the invention resides in means for feeding the nuts one at a time. This means includes a locking sleeve that has a locking groove therein, the locking sleeve being axially slidable relative to the spindle. Balls are laterally slidable in the wall of the spindle to engage the nut-like objects. The locking sleeve causes the sliding movement of the balls.

The above and other features of this invention will be fully understood from the following detailed description and the accompanying drawings, in which:

Fig. 1 is a side elevation, partly in cutaway cross-section, of a driver according to this invention;

Figs. 2 and 3 are cross-sections taken at lines 2—2 and 3—3, respectively, of Fig. 1;

Figs. 4, 5 and 6 are fragmentary elevations, partly in cutaway cross-section, showing the driver of Fig. 1 in successive operational positions in the course of tightening down a fastener; and Figs. 7 and 8 are fragmentary cross-section views taken at lines 7—7 and 8—8, respectively, of Fig. 1.

In Fig. 1 there is shown a driver 10 which includes a front cover 11, a bearing plate 12, and a rear cover 13. This stack of two covers and bearing plate forms a body which is maintained assembled by three screws 14 (Fig. 2) which pass through the front cover and bearing plate and are received in receptacles (not shown) in the rear cover.

The front cover, bearing plate, and rear cover each has a spindle passage 15, 16, 17, respectively. These passages are axially aligned. A drive spindle 18 fits in these passages.

Within spindle passage 15 there is placed a flanged bearing 19. Within the passage 17 there is placed a ring bearing 20. A lock ring 21 is snapped into a groove 22 on the spindle, the lock ring being adjacent to the ring bearing 20. The lock ring limits the movement of the spindle to the right in Fig. 1. The spindle has an external shoulder 23 adjacent to the flange on bearing 19. Shoulder 23 abuts bearing 19 to limit movement of the spindle to the left in Fig. 1.

The spindle has an external key slot 24 for receiving a key 25. The slot and key are placed axially between bearings 19 and 20. The key fits in slot 24 in the spindle and also in a slot 26 in a spur gear 27, thereby coupling the spur gear to the spindle.

Spur gear 27 meshes with an offset, second spur gear 28 that is rotatably mounted on a shaft 29. Shaft 29 is held in bearings (not shown) in the front and rear covers, respectively. Spur gear 28 rotates in a passage 32 in the bearing plate, and meshes with a third spur gear 33. Spur gear 33 is coupled by a key 34 to a shaft 37. Slots 35 and 36 in the gear and shaft, respectively, receive the key. The shaft turns in a bearing 36a in the front cover.

Shaft 37 has an opening 38 for receiving a pinion 39 or other means of connection to a drive motor 40. The drive motor 40 is shown only schematically, as it forms no part of the invention. It is applied to the pinion 39 and to the rear cover at a recess 41 in conventional driving relationship. Operation of the drill motor will drive the gear train consisting of the spur gears 27, 28, and 33 so as to turn the drive spindle 18.

At the left-hand end of the driver as shown in Fig. 1, the rear cover is provided with a threaded receptacle 42. An end plug 43 is threaded into this receptacle. A lock nut 43a is threaded onto the end plug and bears against the rear cover. The end plug has a bore 44, which bore terminates at a neck 45 to which a feed tube 46 is attached by pushing the tube over the outside of the neck 45.

Within the end plug there is a central bore 37 with a counterbore 48 at its right-hand end, as shown in Fig. 1. Three exterior slots 49 are formed 120° apart, as best shown in Fig. 8. In each of these slots there is placed a flat leaf spring 50 (sometimes called a "finger") which is held at its outer end by a screw 51. The free end of each spring projects inside the counterbore and an elastic ring 52, such as an O ring, is seated in the counterbore and backs up the springs 50 so as to bias them inwardly toward axis 52a of the tool.

At the right-hand end of the drive spindle, as shown in Fig. 1, there are provided feed control means 53. These means include an outer locking sleeve 54 which has a pad 55 at its free end. The pad is tubular and is threaded to a lip 56 on the end of the sleeve. The pad may conveniently be made of nylon or some other non-marking material. Spaced slightly from the free end of the locking sleeve there is an interior circumferential locking groove 57 which extends all the way around the inside wall of the locking sleeve. The locking groove has two tapered shoulders 58, 59 which are separated from each other by a flat bottom 60, the bottom extending a substantial axial distance between the shoulders. At the right-hand end of the spindle and forming a continuation thereof, there is a drive socket 61a which is threaded to the spindle. The drive socket has a passage 61b which is prismatic and whose walls are aligned with the walls of the spindle passage. The socket includes six ball-retaining cages 61c (see Fig. 3). These cages are conveniently formed by drilling a counter-sunk hole through the wall of the drive spindle from the outside, leaving shoulders 62 which have a lesser diameter than the diameter of balls 63 which are placed in the cages, so that the balls cannot fall into the central passage that passes through the spindle. The balls are placed in the drive socket, and turn with the spindle itself, the socket forming in effect a part of the spindle. The balls are slidable toward and away from the central axis of the spindle as a function of the relative axial position of the locking sleeve and the drive spindle.

At the end of the locking sleeve closest to the front cover, there is an outer flange 64. A retainer sleeve 65 is threaded into a receptacle 66 on the front cover. A screw 65a is threaded through retainer sleeve 65 and into locking sleeve 54 to restrain the locking sleeve against rotation. The point of screw 65a fits into an axial groove 65b which permits the locking sleeve to axially slide relative to the retainer sleeve, but restrains the two against relative rotation. A lock nut 66a is threaded onto the retainer sleeve, and bears against the front cover. The retainer sleeve has an overhanging shoulder 67 which is engagable by outer flange 64 on locking sleeve 54. This keeps the locking sleeve on the driver. The spindle is provided with a spring-retaining shoulder 68. A spring 69 is opposed between shoulder 68 and flange 64, to bias the locking sleeve 54 in a direction away from the front cover.

The spindle has an interior spindle passage 70 which has, in this case, a hexagonal cross-section; that is, it has continuous planar hexagonal walls in a prismatic array, all of which walls are parallel to the central axis of the spindle. A hexagon has been adopted in the tool shown for the purpose of providing the most convenient driving connection for driving a hexagonally-headed nut which is yet to be described. It will be understood that substantially any other non-circular cross-section could have been provided instead of the hexagonal prismatic section shown, and that the cross-section can be changed to accommodate other nut shapes.

Feed tube 46 has a central axis 71 which aligns with central axis 52a of the spindle where the tube fits over neck 45. The tube is flexible and may conveniently be made out of substantially any plastic material which is resistant to abrasion and handling. In use, the tube is connected to a source of compressed fluid, such as a compressed air line 72. The fluid under pressure is applied to a piston 73. The piston is biased by this pressure to force a train of nuts 74 toward and through the spindle.

Only three nuts are shown in Fig. 1. The left-hand nut is shown abutted by the piston, and the right one engaged by the balls. In practice, the space between these two end nuts is filled with similar nuts. The nut immediately adjacent to the piston will be described in detail. It includes a hexagonal head section 75 with an adjacent groove 76. The remainder of the nut, apart from the hexagonal section, is generally of circular or elliptical cross-section. The nut (see Fig. 4) is provided with internal threads adapted to be driven onto a bolt or other threaded means. The interior part of the hexagonal section is not threaded inasmuch as this section is intended to be torqued off at the groove.

The operation of the device will now be described in connection with the attachment of a nut, such as nut 74, onto a stud. It will be noted that this driver provides torque to the nut, but does not provide means for holding the stud or other threaded object against rotation. Accordingly, this driver is principally adapted to use in installations wherein the threaded object to which the nut is applied has a rigid fit, in the body to which it is attached. A stud is an example. The tool is also useful where a bolt is backed up, perhaps by another operator with a wrench.

As has been stated heretofore, when the drive motor is placed in operation, it applies its torque between the rear cover and the pinion 39, thereby driving the gear train and turning the rotary spindle. The air pressure from source 72 presses the train of nuts along the tube so that the nuts tend to enter the spindle passage 70. It will be noted that the end of the feed tube is not rotating, while the adjacent end of the spindle is. Without the drag means shown, it is possible that a nut might bear against the spindle, out of registration therewith, and spin along with the spindle so that it would never enter the same. The drag means avoids that situation. They permit the round portion of the nut to freely enter the spindle, but exert a drag on the hexagonal-headed part. While the nut may still spin, the drag causes it to spin at a slower rate than the spindle and, with the bias force from the piston exerted on the nut, at some instant the nut will pop into the spindle passage 70, and be moved along by the pressure of the nuts which follow it. In this way, a continuous train of nuts will ultimately reach the driving end of the driver.

Fig. 7 illustrates a modification of the left-hand end of the spindle, as shown in Fig. 1. It has been found that occasionally there is some tendency for nuts to "hang" up at this end of the spindle, despite the presence of the braking means. Accordingly, it has been found desirable to modify the hexagonal shape of the end of the spindle passage by filing out chamfers 100 at the intersection of each prismatic face with the left-hand end of the spindle passage. It will be observed that these chamfers form what may be denoted as a "fast lead." With the direction of the spindle rotation indicated by arrow 101, the chamfers are tapered and radially farther away from the central axis 52a as they recede from the leading part of the prismatic edge which they modify.

The first operational position of the driver in setting a nut is shown in Fig. 4. The nut is just being engaged with the threads of a stud 81 which stud makes a tight fit in a bar 82 or other object.

Locking sleeve 54 had been fully extended by spring 69 prior to making contact with body 82. At that position, the locking groove 57 is below balls 63. The inner wall of the locking sleeve moves the balls laterally inward, so that they project into the spindle passage and stop the end one of the stop nuts in the spindle. Thus, the end lock nut is biased toward the stud, and is restrained by the balls.

After the spindle has made a few turns with the nut engaged with the stud, the condition shown in Fig. 5 occurs. Pad 55 has made contact with body 82. The spindle has been drawn down, because the hexagonal portion 75 bears against the balls, and this engagement requires the spindle to move with the nut. Thus, the locking sleeve moves "back" relative to the spindle, and groove 57 is moved back of the balls. This permits the balls to recede into their cages.

After further turning, the nut is tightened down against body 82, and when enough torque is exerted, the hexagonal part torques off at a section denoted by numeral 83. The lower part of the fastener remains threaded on the stud, and the upper, hexagonal part is now free—the inside part of this section is not threaded.

Now, with the spindle still turning, if desired, the driver is backed off. The bias force on the train of nuts forces the sheared-off hexagonal section out of the spindle passage, and moves the lower end of the next nut past the balls while they are still outwardly disposed. It will be noted that the groove 57 has a significant axial length, so that the nut motion can occur during the outward movement of the tool. Shortly thereafter, the groove passes the balls, and the balls are forced inwardly into the path of the hexagonal part of the next nut, stopping the same, and the cycle can be repeated.

The operation of the drag means to control the passage of nuts from the feed tube to the spindle will now be described. The tubes may conveniently be preloaded, not necessarily by the tool operator. They need not be oriented rotationally. With the kind of nut disclosed herein, they need to be oriented all in the same head-to-toe relationship, but with other kinds of nuts, even this orientation can be dispensed with.

After a filled tube is connected between the driver and the fluid pressure, the drive motor is turned on. The nuts are biased so as to move into the spindle passage. Of course, to enter this passage they will have to become rotationally oriented. What must be avoided is having a nut pressed against the end of the spindle, at a phase angle relative thereto, and spinning at the same rate as the spindle. Then the nut would never enter the passage. The drag means avoid this by slowing down the nut.

The nut and spindle therefore move at a different rate, and finally are in alignment at some moment. Then the bias force pops the nut into the passage.

It is possible that the same nut may for a time be engaged both by the drag means and by the spindle, but this does no harm, because the drag means will permit the nut to turn at the speed of the spindle when engaged by the spindle.

This tool is useful for setting many types of fasteners in addition to fasteners of the type illustrated. The orienting device is useful for nearly any type of fastener, and the one-at-a-time feed control means are particularly useful with an externally grooved fastener.

This invention is not to be limited by the embodiment shown in the drawings and described in the description, which is given by way of example and not of limitation, but only in accordance with the accompanying claims.

I claim:

1. A tool for driving nut-like objects, comprising: a frame; a spindle rotatably mounted in the frame, said spindle having a central axis and an axial prismatic passage therethrough, the passage being open at both of its ends; means for rotating the spindle in the frame; means for controlling the passage of nut-like objects out of the passage comprising a lock sleeve surrounding a portion of the spindle, said lock sleeve having an internal groove therein, a ball cage extending laterally through the spindle, a lock ball in said cage laterally movable relative to the axis of said spindle as a function of the position of said lock sleeve and its groove relative to said ball, and means biasing the lock sleeve in one axial direction; feed means adjacent one end of said spindle passage and registering therewith, said feed means comprising a tube adapted to hold a plurality of nut-like objects to be fed to the spindle passage, a piston in said tube adapted to be moved by fluid force against the said nut-like objects to force them toward the spindle passage; and drag means adjacent the joint of the feed means and the spindle passage for braking the rotation of nut-like objects.

2. Apparatus according to claim 1 in which the groove in the locking sleeve extends peripherally around the interior thereof, and in which a plurality of said cages and lock balls are provided, the lock balls being movable away from said axis when the groove is axially aligned with the balls, and the balls being moved toward the axis by the sleeve when the groove is not aligned therewith.

3. Apparatus according to claim 2 in which spring means bias the locking sleeve away from the body.

4. Apparatus according to claim 3 in which the drag means comprise fingers which are yieldingly biased towards the central axis.

5. A feed device for a rotary driver for rotationally aligning a previously randomly assorted group of nut-like objects and feeding one at a time therefrom, comprising: a tube having an axis, said tube being adapted to enclose a train of nut-like objects which are randomly oriented around said axis; a hollow spindle joined to the tube having a central passage defined by a wall with a substantially continuous cross-section defining a path of rotationally oriented objects, said spindle passage and tube being aligned where the tube and spindle join; and frictional drag means adjacent the joint between the tube and spindle, the tube and spindle being rotatable relative to each other.

6. A magazine-type feed device for rotationally aligning and driving nut-like objects which have the non-circular cross-section at some location along their length, comprising: a hollow spindle having an axis and an axial passage therethrough, which passage has a cross-section in a plane normal to said axis which is geometrically congruent to at least a part of the noncircular contour of the nut-like objects, thereby providing surfaces parallel to said axis adapted to engage particular surfaces of said non-circular sections; means for rotating said spindle around its axis, a tube having an axial passage aligned with and joined to the spindle passage; and drag means between the tube and the spindle for braking the nut-like objects.

7. A tool for driving nut-like objects comprising: a frame; a spindle having a central axis, which spindle is rotatably mounted in said frame; means for rotating said spindle, said spindle having an axially extending non-circular passage extending therethrough; means for feeding nut-like objects in succession to the passage in said spindle, said means comprising a tube loaded with said nut-like objects, a piston in said tube bearing against one of said nut-like objects, said tube being adapted to be attached to a source of fluid pressure for biasing the piston toward and against the nut-like objects in order to move them into the spindle; means for discharging said objects from the spindle one by one; and drag means disposed adjacent to the joint of the tube in the spindle passage for braking rotation of said objects.

8. Apparatus according to claim 1 in which the drag means comprises a plurality of spring fingers which enter the tube to bear against the closest of the nut-like objects to the spindle, said fingers being yieldable to permit the nut-like object to rotate, but at a rate slower than the spindle's rate of rotation.

9. Apparatus according to claim 2 in which the groove in the locking sleeve has a cylindrical bottom with a substantial axial length, and a sloping shoulder at the end of the groove closer to the body for shifting the balls inwardly from the flat bottom to the adjacent wall of the sleeve, whereby when the sleeve is moved toward the body from its most extended position, the balls which were initially held inwardly by the sleeve so as to project into the spindle passage, move into said groove and out of the passage, and dwell there for the period during which the flat portion of the groove is adjacent to the balls, so as to clear one of the nut-like objects, restoration of the sleeve to its extended position causing said shoulder to again force the balls out of the groove and into the passage to restrain the next nut-like object.

10. Apparatus according to claim 1 in which the end of the spindle facing the tube has a sloping chamfer adjacent to each path-defining surface in the spindle passage, said chamfers tapering and departing farther from the central axis as they extend in the opposite direction from the direction of the spindle's rotation.

11. Apparatus according to claim 9 in which the end of the spindle facing the tube has a sloping chamfer adjacent to each path-defining surface in the spindle passage, said chamfers tapering and departing farther from the central axis as they extend in the opposite direction from the direction of the spindle's rotation.

12. Apparatus according to claim 5 in which the drag means comprises a plurality of spring fingers which enter the tube to bear against the closest of the nut-like objects to the spindle, said fingers being yieldable to permit the nut-like object to rotate, but at a rate slower than the spindle's rate of rotation.

13. Apparatus according to claim 5 in which the end of the spindle facing the tube has a sloping chamfer adjacent to each path-defining surface in the spindle passage, said chamfers tapering and departing farther from the central axis as they extend in the opposite direction from the direction of the spindle's rotation.

14. Apparatus according to claim 6 in which the drag means comprises a plurality of spring fingers which enter the tube to bear against the closest of the nut-like objects to the spindle, said fingers being yieldable to permit the nut-like object to rotate, but at a rate slower than the spindle's rate of rotation.

15. Apparatus according to claim 6 in which the end of the spindle facing the tube has a sloping chamfer adjacent to each path-defining surface in the spindle passage, said chamfers tapering and departing farther from the central axis as they extend in the opposite direction from the direction of the spindle's rotation.

References Cited in the file of this patent

UNITED STATES PATENTS

| | | |
|---|---|---|
| 2,256,012 | Blair | Sept. 16, 1941 |
| 2,575,525 | Mitchell | Nov. 20, 1951 |
| 2,607,252 | Shaff | Aug. 19, 1952 |
| 2,704,952 | Mooter | Mar. 29, 1955 |
| 2,705,896 | Holmes | Apr. 12, 1955 |
| 2,868,053 | Jorgensen et al. | Jan. 13, 1959 |
| 2,878,700 | Reynolds | Mar. 24, 1959 |

FOREIGN PATENTS

| | | |
|---|---|---|
| 581,943 | Great Britain | Oct. 30, 1946 |